3,451,977
PROCESS FOR POLYMERIZING 2-METHYLENE
GLUTARONITRILE
John M. Hoyt and Karl Koch, Cincinnati, Ohio, assignors to National Distillers and Chemical Corporation, New York, N.Y., a corporation of Virginia
No Drawing. Filed July 27, 1964, Ser. No. 385,470
Int. Cl. C08f 3/74, 15/40, 15/22
U.S. Cl. 260—78.4                  11 Claims This invention relates to novel polymer products and to methods for preparing the same. More particularly, the invention pertains to homopolymers and copolymers of 2-methylene glutaronitrile as well as to their methods of preparation.

In copending U.S. patent application Ser. No. 271,463, filed Apr. 8, 1963, there are disclosed methods for preparing the novel acrylonitrile dimer, 2-methylene glutaronitrile, having the following structure:

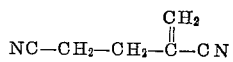

This novel compound has a unique structure because of the combination of the $CH_2=C<$ grouping with the two nitrile groups.

One object of the present invention is to provide novel solid homopolymers of 2-methylene glutaronitrile.

Another object of the present invention is to provide novel solid copolymers of 2-methylene glutaronitrile with a variety of unsaturated monomeric compounds.

A further object of the present invention is to provide methods for the preparation of these novel homopolymer and copolymer products.

These and other objects of the present invention will become readily apparent from the ensuing description and illustrative embodiments.

In accordance with one aspect of the present invention, it has been found that novel solid homopolymers of 2-methylene glutaronitrile can be prepared consisting essentially of recurring units of the following formula:

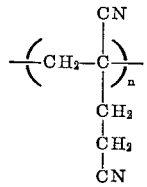

wherein $n$ is an integer of at least 10 and as high as 10,000, and wherein the $CH_2/CN$ ratio is 1.5. The average molecular weight of the novel polymeric products of this invention will range from about 1,000 to 1,000,000, and preferably about 2,000 to 200,000 which are determined from viscosity and intrinsic viscosity measurements. Specific viscosity is the viscosity of the polymeric solution less the viscosity of the solvent, divided by the viscosity of the solvent. These measurements are made in dimethyl formamide solutions at a polymer concentration of 0.5 gm. per 100 ml. By "intrinsic viscosity" it is meant the limit of the ratio between the specific viscosity and concentration for concentrations tending to zero. The intrinsic viscosity of the novel polymeric products of this invention will range from about 0.05 to 8.0, and preferably from about 0.2 to 5.0. It is also preferred in the above recurring units to have $n$ range from about 20 to 2,000.

As noted above, the monomer employed to prepare the polymers of this invention possesses a unique chemical structure comprising a terminal methylene group with the second carbon atom of the double bond attached to both a nitrile and a cyanoethyl grouping. These two substituents on the same carbon atom impart a moderated polymerizability to the double bond, and a high degree of hydrocarbon resistance to the resultant polymers. An example of the utility and unexpected novelty of these products is illustrated by comparison with the polymers and copolymers of acryonitrile.

Acrylonitrile polymers and copolymers are widely employed as fibers, coatings, rubbers and for various other purposes. The properties of these polymers and copolymers may be varied within wide limits by variation in composition, molecular weight, and structure, the latter being in turn a function of the method of polymerization. However, there are some structural and property variations which it is not possible to obtain because of the very high polymerization activity of acrylonitrile and because of the limited structural variations possible. All addition polymers of acrylonitrile, for example, contain the structural unit

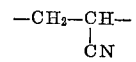

and this unit has a certain specific and limited effect on such properties as oil resistance, elasticity (in copolymers with butadiene), etc. Similarly, the techniques of incorporating acrylonitrile into, e.g., the so-called ABS (acrylonitrile-butadiene-styrene) copolymers are limited by the very high reactivity of acrylonitrile thereby limiting the types of structure obtainable.

It has now been found that 2-methylene glutaronitrile can be polymerized and copolymerized under a variety of conditions outlined below to yield polymers and copolymers having a range of useful properties differing substantially from those obtainable from acrylonitrile polymers and copolymers. The copolymer with butadiene, for example, has improved oil resistance over the corresponding acrylonitrile copolymer while at the same time retaining good elastomeric properties. The homopolymers of 2-methylene glutaronitrile also are very different from those of acrylonitrile melting almost 100° C. lower and being much more tractable for molding and film applications.

Preparation of 2-methylene glutaronitrile polymers and copolymers may be carried out using any of a variety of systems including emulsion, solution and bulk, at temperatures in the range of −150° to +100° C. A variety of initiators including free radical (e.g. peroxides) and anionic (e.g., organometallic compounds) may be employed. In general, the choice of system and initiator will be influenced by the other comonomer, e.g., in copolymerization with ethylene, reaction is carried out with peroxide initiation and at very high (20,000–30,000 lbs. sq. in.) pressures.

2-methylene glutaronitrile may be copolymerized with any of a large number of unsaturated compounds to yield new and useful polymers. These include styrene, butadiene, acrylonitrile, ethylene, propylene, isobutylene, vinyl acetate, vinyl chloride, vinylidene chloride, methyl acrylate, butyl methacrylate, vinyl ethers, singly and in selected combinations as may be desired to obtain certain physical properties.

The homopolymers and copolymers prepared from 2- methylene glutaronitrile are useful in preparing molded articles, films, sheets, fibers, coatings, elastomers, etc. It is also possible to prepare stereospecific polymers from 2-methylene glutaronitrile or derivatives thereof.

For example, the stereospecific addition polymerization of 2-methylene-glutaronitrile is expected to produce two types of stereoregular homopolymers, an isotactic type (I) and a syndiotactic type (II).

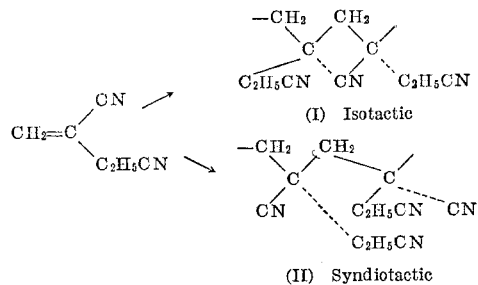

In the spatial representations (I) and (II) the dotted lines signify that the attached group is behind the plane of the paper. Stereoregular poly(2-methylene glutaronitrile) may exist as a substantially pure isotactic (I) or syndiotactic (II) polymer or its chain molecules may be built up with sequences of both structure (I) and (II) in the same chain molecule (stereoblock polymer).

In general, the poly(2-methylene glutaronitrile) is prepared from substantially pure 2-methylene glutaronitrile at temperatures below about 0° C., and preferably within the range of about −150° to +100° C. in the presence of an anionic catalyst. In actual practice it has been found useful to conduct the polymerization with agitation or stirring under an inert atmosphere such as nitrogen, argon, helium, mixtures thereof, and the like. A number of anionic catalyst systems can be employed to effect the polymerization of this invention. These catalyst systems include:

(1) Sodium cyanide (NaCN) in an organic solvent such as N,N-dimethylformamide. Other possible solvents are N,N-dimethylacetamide, N-methylpyrrolidine, dimethylsulfoxide, dimethylsulfone, tetramethylurea, methylphosphoric triamide, or mixtures thereof. The amount of NaCN in the catalyst solution will be within the range of about 0.01 to 5.0%, and preferably about 0.1 to 1%, by weight.

(2) Sodium in liquid ammonia. The monomer is generally diluted with liquid ammonia. The concentration of monomer may vary from 0.001 to about 10 parts of monomer per part of ammonia, preferred 0.10 to 1. The sodium may be added before adding the monomer, during the addition or afterward; preferably it is added before adding the monomer. The amount of sodium may vary broadly from 0.0001 to 10 parts per part of 2-methylene glutaronitrile, preferably from 0.01 to 0.1 part. The liquid ammonia can be replaced by related liquids such as methylamine, dimethylamine, triethylamine, etc. The sodium may also be substituted by other metals such as lithium, potassium, rubidium or cesium. In practicing this particular method of preparation it has generally been found desirable to destroy any sodium compounds which may have been formed. This can be accomplished, for example, by adding to the resulting reaction mixture a compound such as ammonium chloride, methanol, ethanol, isopropyl alcohol, mixtures thereof, and the like. It will be understood, however, that other materials capable of destroying the sodium compound may be employed provided that it does not deleteriously affect the polymer product. After the destruction of the sodium by-products, the resulting polymerization reaction mixture is warmed to room or ambient temperature to permit ammonia to evaporate. In order to convert any viscous polymer products to solid form, water is stirred into the polymerization reaction mixture following evaporation of the ammonia. The amount of water employed for this purpose is not critical and need only be sufficient to maximize the yield of the solid polymer product. The addition of the water is generally carried out while the polymerization reaction product is being agitated or stirred.

(3) Organo-metallic compounds. The preferred catalysts here are organoalkali and organoalkaline earth metal compounds such as butyllithium, phenyllithium, amylsodium, butylpotassium, diethylmagnesium, mixtures thereof, and the like. The organo radicals in such compounds are lower straight or branched chain alkyl or aryl groups having from 1 to 18 carbon atoms, whereas the metal components are selected from the group consisting of lithium, sodium, potassium, rubidium, cesium and magnesium.

In some instances it may be desirable to wash the polymeric product thus formed to remove residual impurities. Although it is preferred to employ water for this purpose, other materials such as methanol, isopropyl alcohol, or mixtures thereof can be utilized.

The preferred catalyst systems for carrying out the homopolymerization of the 2-methylene glutaronitrile are NaCN in a solvent such as N,N-dimethylformamide and sodium in liquid ammonia, since it has been found that higher yields of the desired polymer product will be attained.

The preparation of the poly(2-methylene glutaronitrile) polymers of this invention will be more fully understood by reference to the following illustrative embodiments.

EXAMPLE I

A 500 ml. two-necked round bottom flask was equipped with a mechanical stirrer, thermometer, and nitrogen gas inlet. The glassware was previously heated at 190° C. in an oven and then assembled in a nitrogen atmosphere. To the flask was added 200 ml. of redistilled N,N-dimethylformamide and 50 ml. (48.7 g., 0.46 mole) of 2-methylene glutaronitrile, 99.9% pure by gas-chromatographic analysis. The mixture was cooled to −32° C. whereupon 32.2 ml. of a saturated catalyst solution of dry NaCN in N,N-dimethylformamide (about 1% concentration) was added at intervals over 50 minutes, the temperature being held at −42 to −32° C. At the end of this time a 0.1 ml. sample of the mixture added to water produced only faint turbidity. The 0.1 ml. sample, originally colorless, turned yellow on warming, before addition to water.

The colorless solution in the flask was then allowed to warm up. At about −30° C. the entire solution became yellow. The temperature was now held at −23 to−15° C. After 1⅓ hours total elapsed time, 3 ml. more catalyst solution was added; and after 1½ hours total elapsed time, a sample of the solution produced a white, flocculent precipitate when added to water, indicating the presence of polymer. More catalyst solution (10 ml.) was added and the yellow solution was stirred at −23 to −15° C. until the total reaction time was 3¾ hours, whereupon the solution was poured into 800 ml. water containing 20 ml. 6 N $H_2SO_4$. The white solid which separated was collected, washed with water, methanol and dried 24 hours in vacuum at 35° C., 9.4 g. (19.3%). Inherent viscosity was 0.055 (50° C., 0.5 g. per 100 ml. N,N-dimethylformamide). An analytical sample was prepared by twice dissolving the polymer in acetone and precipitating in methanol, finally dissolving in acetone and reprecipitating in petroleum ether; the polymer melt temperature was 136° C. (Dennis Bar).

*Analysis.*—Calculated for $(C_6H_6N_2)_n$: N, 26.40%. Found: N, 24.83%.

EXAMPLE II

A 500 ml. three-nicked round-bottom flask was equipped with mechanical stirrer, $N_2$-inlet and inlet to introduce liquid $NH_3$. The glassware was flamed and then cooled in a nitrogen atmosphere. By means of Dry-Ice-acetone mixture the flask was chilled and into it was introduced 100 ml. of liquid NH₃. A 0.3 g. portion of sodium was added, followed after 5 minutes by 25 ml. (24.4 g., 0.23 mole) of 2-methylene glutaronitrile (99.9% purity). Polymerization was very rapid and after 5 minutes longer, 2 g. of NH₄Cl was added to destroy sodium compounds. The viscous mixture in the flask was allowed to warm to room temperature to permit NH₃ to evaporate and finally was stirred with 100 ml. of water. The yellow-orange solid product was washed with water, methanol and dried in vacuum at 35° C.; yield, 23.9 g. (98%); inherent viscosity 0.17 (N,N-dimethylformamide, 50° C., 0.5 g. per 100 ml.); polymer melt temperature, 198° C. (Dennis Bar).

EXAMPLE III

A 500 ml. three-necked flask equipped with a mechanical stirrer, N₂-inlet and a port capped with a rubber serum cap for introducing liquids by hypodermic syringe. The system was flamed out and dried in a nitrogen atmosphere. Into the flask was introduced 100 ml. of dry toluene followed by 25 ml. (24 g., 0.226 mole) of 2-methylene glutaronitrile. The solution was cooled to about −50° C. under N₂ and 2 ml. of a 1.5 M hexane solution (3 mM.) of n-butyl lithium was added. The mixture was stirred for three hours at −50 to −10° C. and then poured into 500 ml. of methanol. The pale yellow solid product was collected, washed with methanol, water and finally methanol and dried, 1.06 g. (4.35%). Polymer melt temperature was 189° C. (Dennis Bar).

The above data show that the novel homopolymers of 2-methylene glutaronitrile can readily be prepared by utilizing the disclosed polymerization processes without the use of exotic catalyst systems or elaborate processing conditions and equipment.

In accordance with another aspect of the present invention, it has also been found that the 2-methylene glutaronitrile can be readily copolymerized with different monomers to prepare novel polymeric products. These different monomers or comonomers can be various unsaturated compounds capable of undergoing the desired copolymerization. Typical comonomers which can be employed for this purpose include compounds of the formula

$$R_4R_3C\!=\!CR_2R_1$$

where $R_1$ and $R_2$ are hydrogen; CN; a halogen such as fluorine, chlorine, or bromine; a lower alkyl group, straight or branched chain, having from 1 to 18 carbon atoms; an aryl group such as phenyl, p-tolyl, or α-naphthyl, having from 6 to 20 carbon atoms; an alkaryl group, an alkoxy group, an aryloxy group, an acyloxy group, a carboxy group, a carbamyl group, a carboalkoxy group, or a heterocyclic group having from 1 to 20 carbon atoms; wherein $R_3$ is hydrogen, a halogen such as fluorine, chlorine or bromine; a lower alkyl group, straight or branched chain, having from 1 to 10 carbon atoms; and wherein $R_4$ is hydrogen, or vinyl, or 2-propenyl.

Illustrative compounds encompassed by the foregoing structural formulae include: acrylonitrile, methacrylonitrile, ethylene, propylene, butene-1, butene-2, isobutylene, pentene-1, pentene-2, 3-methyl-1-butene, 2-methyl-2-butene, vinyl chloride, vinylidene chloride, methyl methacrylate, methyl acrylate, vinyl methyl ether, vinyl acetate, styrene, 2-methylstyrene, 2-vinylpyridine, butadiene-1,3, 2-chlorobutadiene-1,3, 2-fluorobutadiene-1,3, 2-methylbutadiene-1,3, 2,3-dimethylbutadiene-1,3, etc.

The relative amounts of the 2-methylene glutaronitrile and the comonomer employed in the feed mixture can vary over a wide range. In general, however, the mole ratio of the 2-methylene glutaronitrile to the comonomer will range as widely as from about 0.1/99.1 to 99.9/0.1 and preferably from 5/95 to 95/5.

It is also possible to polymerize mixtures of more than two monomers, in which mixtures one component is 2-methylene glutaronitrile. For example, ternary mixtures of 2-methylene glutaronitrile, butadiene-1,3 and styrene can be copolymerized to produce resinous interpolymers having valuable properties such as high impact resistance and high flexural stiffness. Alternatively, the copolymers of butadiene-1,3 with 2-methylene glutaronitrile of this invention, in the latex form, may be combined with styrene or mixtures of styrenes with 2-methylene glutaronitrile, or styrene with acrylonitrile or styrene with both 2-methylene glutaronitrile and acrylonitrile and then subjected to a further emulsion polymerization to produce similar valuable resinous products. In other variations of this same general method it is preferred to employ latices of polybutadiene and then in the second step to polymerize in these latices mixtures of such monomeric materials as styrene and 2-methylene glutaronitrile; styrene, acrylonitrile and 2-methyl glutaronitrile; α-methylstyrene and 2-methyl glutaronitrile; or α-methylstyrene, acrylonitrile and 2-methylene glutaronitrile.

While the resinous products disclosed in the foregoing paragraph are generally produced by emulsion polymerization techniques, either in one or in several steps, it is also possible to employ solution or suspension polymerization procedures. Moreover, it is desirable to produce these complex resinous materials merely by the mixing of various latices before precipitation. For example, a latex of a copolymer of butadiene with 2-methylene glutaronitrile might be mixed with a separate latex of a terpolymer of styrene, acrylontrile and 2-methylene glutaronitrile. The mixed latex is then precipitated and processed in the usual manner.

In certain other instances valuable resinous products are obtained by the direct milling together, in appropriate proportions, of the copolymers themselves. For example, a copolymer of butadiene and acrylonitrile might be milled with a copolymer of styrene and 2-methylene glutaronitrile.

The novel copolymers of this invention are preferably prepared by an emulsion copolymerization procedure. In general, the process comprises heating the 2-methylene glutaronitrile and the comonomer together in an aqueous emulsion in the presence of a free radical yielding catalyst. Examples of the preferred catalysts include, among others, salts of peracids such as ammonium persulfate, potassium persulfate, peroxides such as benzoyl peroxide, hydrogen peroxide, di-tertiary butyl peroxide, di-tert.-butyl succinate, tert.-butyl peracetate, etc. The amount of the catalyst employed is preferably between 0.05 to 5% by weight of the monomers to be copolymerized, and still more preferably between about 0.1 to 1.0% by weight thereof. In addition, certain reducing agents may be used in conjunction with the peroxy catalysts to promote radical generation at lower temperatures, such as, for example, alkali metal sulfites and bisulfites.

Any of the known emulsifying agents may be employed. These include particularly the ionic surface active agents, especially those having a polar structure including a hydrophilic (predominantly hydrocarbon) residue and a charged (ionic) radical thereon, such as anionic surface-active compounds including alkali metal and nitrogen-base soaps of higher fatty acids, such as potassium and/or sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, and palmityl amine hydrobromide. Additional examples of suitable ionic surface-active emulsifying agents include the alkali metal or ammonium alkyl or alkylene sulfates or sulfonates, such as sodium and/or potassium lauryl sulfate, alkyl, aryl and alkylated aryl sulfonates, cetyl sulfonate, oleyl sulfonate, stearyl sulfonate, sulfonated Turkey red oil, sulfonated mineral oils, sodium, potassium and ammonium isopropyl naphthalene sulfonate, amine soaps, such as triethanolamine stearate, amino-substituted alcohols, sulfonated fatty esers and amides, the hydrochloride of diethyl aminoethyloleylamide, trimethylcetyl ammonium methyl sulfate, alkene-sulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol. Starch, gum-arabic, the polyoxyalkylene oxide condensates of hexitan anhydrides, carboxymethylcellulose, etc. may also be used.

The emulsifying agents are preferably employed in amounts varying from about 0.1 to 8% by weight of the monomers to be copolymerized.

The copolymerization reaction mixture may also contain minor amounts of a chain-transfer agent such as a higher alkyl mercaptan having 8 to 18 carbon atoms, which both moderates the molecular weight of the copolymeric products and assists in initiating the action of the catalysts in the copolymerization. Typical examples of the chain-transfer agents include tert.-dodecyl mercaptan, dodecyl mercaptan, hexadecyl mercaptan, and the like.

In general, the amount of water employed in carrying out the emulsion copolymerization process of this invention may be varied and will depend on the equipment employed and the overall production of the copolymeric production. For most purposes it is preferred to employ at least 100 parts of the water per 100 parts of the monomers to be copolymerized, with ranges of about 150 to 300 parts of the water per 100 parts of the monomers being especially preferred.

The copolymerization is generally accomplished in the absence of molecular oxygen. This is preferably achieved by conducting the copolymerization reaction in the presence of an inert gas such as nitrogen, methane, and the like.

Temperatures employed in the formation of the copolymers will vary depending upon the rate desired, catalyst selected, and the like. Preferred temperature range from about −40° to 100° C., and the temperatures within the range of about 30° to 70° C. are especially preferred. It will also be understood that the copolymerization reaction of this invention may also be carried out while agitating or stirring the reaction mixtures undergoing copolymerization, and that the feed materials including the monomers, the water, the dispersing agents and the initiator to the reaction zone either initially or in increments during the reaction. Superatmospheric, atmospheric or sub-atmospheric pressures may be used as desired. It is also convenient at times to add a copolymerization stopper to the reaction product mixture at the conclusion of the reaction in order to avoid undesirable by-products and runaway conditions from occurring. Compounds which are effective for this puropse include hydroquinone, quinone, phenyl-beta-naphthylamine, and the like.

It will also be understood that anionic catalyst systems, as described above, may also be employed to effect the desired copolymerization. Thus, for example, it has been found that sodium cyanide in combination with N,N-dimethylformamide will result in high yields of a copolymer formed from 2-methylene glutaronitrile and acrylonitrile.

The preparation of the novel 2-methylene glutaronitrile copolymers which are encompassed by the present invention will be more fully understood by reference to the following illustrative embodiments.

EXAMPLE IV

Essentially as described in Example I a mixture of 10 ml. (8.0 g., 0.15 mole) of acrylonitrile and 10 ml. (9.6 g., 0.090 mole) of 2-methylene glutaronitrile (62/38 mole ratio in feed of acrylonitrile to 2-methylene glutaronitrile) in 120 ml. of anhydrous N,N-dimethylformamide at −50° C. was treated with 2 ml. of a saturated (∼1%) solution of dry NaCN in N,N-dimethylformamide. After 30 min. another ml. NaCN solution was added and the mixture was held with stirring at −50° C. for an additional 30 min.

The reaction mixture was treated with 5 ml. of 3% aqueous $H_2SO_4$ solution and then poured into 500 ml. of $H_2O$. A stringy, almost white, curdy solid precipitated immediately. This was washed twice with water and twice with acetone and dried in vacuum at 65–70° C. to constant weight, 4.71 g. (26.8%) inherent viscosity= 0.10 (0.20 g. per 100 ml. N,N-dimethylformamide, 23.2° C.). The copolymer softened at 225°–229° C. (hot stage microscope). Infrared analysis indicated the copolymer contained about 50 mole percent acrylonitrile and 50 mole percent 2-methylene glutaronitrile.

EXAMPLE V

The copolymerization of acrylonitrile and 2-methylene glutaronitrile was carried out in emulsion at 35°–40° C. according to the following general recipe:

| Ingredients | Parts by weight |
|---|---|
| Water | 120 |
| Monomers | 80 |
| Sodium lauryl sulfate | 2 |
| $K_2S_2O_8$ | Variable |
| $NaHSO_3$ | Variable |

The copolymerizations were carried out in 1-liter, 3-necked round bottom flasks equipped with mechanical stirrer, reflux condenser, nitrogen gas inlet, thermometer and heating mantle. The system was swept with nitrogen, the water and sodium lauryl sulfate added and stirred briefly. The monomers were mixed, added to the flask, pre-emulsified, and then the mixture was heated to the reaction temperature and the persulfate and bisulfite solutions were added.

After the polymerization was over, about 0.1 to 0.2 gm. hydroquinone stopper was stirred into the emulsion and the latter was then added to 500 ml. water. The emulsion was broken by adding sodium chloride and the precipitated polymer washed thoroughly with water, followed by acetone, and dried.

Table I summarizes the copolymerization runs.

TABLE I.—EMULSION COPOLYMERIZATION OF ACRYLONITRILE WITH 2-METHYLENE GLUTARONITRILE (35-40° C.)

| Run No. | AN/MGN charge, mole Percent ratio | $K_2S_2O_8$ parts | $NaHSO_3$ parts | Time, hr. | Yield, Percent | $\eta_{inh}$[2] |
|---|---|---|---|---|---|---|
| 1 | (1) | 0.20 | 0.066 | 1.5 | 86.2 | 5.4 |
| 2 | 99/1 | 0.40 | 0.13 | 1 | 23.8 | 1.28 |
| 3 | 95/5 | 0.40 | 0.13 | 2 | 8.12 | 0.73 |
| 4 | 95/5 | 0.20 | 0.066 | 23 | 3.1 | 0.44 |
| 5 | 90/10 | 0.10 | 0.066 | | | |
| | | 0.10 | 0.066 | 5.6 | | |
| | | 0.10 | 0.066 | 10.6 | | |
| | | | | 18.5 | [5] 48.3 | 1.58 |
| 6 | [3] 90/10 | 0.20 | 0.066 | | | |
| | | 0.20 | 0.066 | 1.0 | | |
| | | | | 2.0 | [4] 6.65 | 0.95 |
| 7 | 75/25 | 0.60 | 0.39 | | | |
| | | 0.40 | 0.26 | 12 | | |
| | | | | 24 | 1.12 | 0.19 |

[1] AN homopolymer.
[2] Inherent viscosity at 50° C. of a 0.50 g. per 100 ml. N,N-dimethylformamide solution.
[3] 85.8 parts total monomers charged.
[4] This copolymer was rubbery when in contact with boiling water, hard and tough at room temperature when dry.
[5] This copolymer was pressed into a sheet at 175° C. which had the following properties: Flex. stiffness (p.s.i.) 375,000, tensile yield (p.s.i.) 7,780, elongation (percent) 0.

EXAMPLE VI

A 1-liter, three-necked flask was equipped with mechanical stirrer, nitrogen gas inlet, reflux condenser, thermometer and heating mantle. The system was flushed with $N_2$. To the flask was added 150 ml. deoxygenated water, 2 g. sodium lauryl sulfate, 60 g. (0.575 mole) of styrene (washed with 5% KOH to remove inhibitor, water and dried over anhydrous $MgSO_4$) 20 g. (0.188 mole) of 2-methylene glutaronitrile and 4 ml. of a 5% aqueous $K_2S_2O_8$ solution. The mole ratio of the 2-methylene glutaronitrile to styrene in the feed was 25/75. The emulsion was rapidly heated to 70° C. and stirred at 70° C. for 2 hours. About 0.1 g. hydroquinone stopper was added, the emulsion was broken by addition to an aqueous NaCl solution. The upper organic layer as well as the lower layer was poured into about 1.5 liters of methanol and the precipitated polymer was washed with methanol and dried; yield, 22.0 g. (27.5%) of a hard, tough solid, inherent viscosity 0.61 (50° C., 0.5 g. per 100 ml. methyl ethyl ketone). The copolymer after reprecipitation from methyl ethyl ketone-petroleum ether and acetone-petroleum ether, contained 8.61% nitrogen on analysis, corresponding to a composition of about 32 mole percent 2-methylene glutaronitrile and 68 mole percent styrene.

charged as follows: 100 ml. of a solution of 15 g. of Duponol ME in 500 ml. aqueous solution; 5 ml. of a solution of 2.93 g. sodium pyrophosphate, 8.8 g. of potassium chloride and 0.81 g. ferric sulfate hydrate (72% min. assay) in 250 ml. aqueous solution; 0.30 ml. of tert.-dodecyl mercaptan; 58.6 g. total monomers; and 0.69 ml. of 30% hydrogen peroxide solution.

After the polymerizations were completed the latices obtained were coagulated by addition to methanol. The coagulated polymer was washed thoroughly with water to remove emulsifier, washed with methanol, dried in vacuum at 45° C. Analytical samples were prepared by two reprecipitations from methyl ethyl ketone-petroleum ether or acetone-petroleum ether.

The results are shown in Table II.

TABLE II.—GENERAL RECIPE

Water, 180 parts by wt.
Monomer, 100 parts by wt.
Duponol ME, 5.1
t-Dodecyl mercaptan, 0.51
KCl, 0.30
Sodium Pyrophosphate, 0.10
Ferric Sulfate percent $H_2O$ (anhydrous basis), 0.02
$H_2O_2$, 30% soln., (anhydrous basis), 0.36

| Run No. | BD/MGN mole ratio charged | Time, hrs. | Percent Yield | $\eta_{inh}$.[1] | BD/MGN mole ratio combined[3] | Appearance |
|---|---|---|---|---|---|---|
| 9 | 95/5 | 16 | 22.4 | 0.58 | 74/26 | Rubbery. |
| 10 | 85/15 | 16 | 14.9 | | | Tough, elastic. |
| 11 | 75/25 | 24 | 8.63 | 0.78 | | Do. |
| 12 | 75-25 | 47 | 12.3 | | 59.5/40.5 | Do. |
| 13 | 50/50 | 24 | 5.0 | 0.48 | | Do. |
| 14 | 50/50 | 47 | 3.0 | 0.63 | 63/37 | Do. |
| 15 | [2] 75/25 | 24 | 52.3 | 1.03 | [4] ~70–30 | Rubbery. |

[1] 0.5 g. per 100 ml. methyl ethyl ketone, 50° C.
[2] Butadiene-acrylonitrile control experiment.
[3] Based on nitrogen analysis of reprecipitated polymer.
[4] Estimated composition of nitrile rubber charged 75/25 butadiene/acrylonitrile at 50% conversion (see G. S. Whitby, "Synthetic Rubber," John Wiley & Co., Inc., N.Y., 1954, p. 806).

EXAMPLE VII

In essentially the same manner as described in Example VI a mixture of 40 g. (0.385 mole) of styrene and 40 g. (0.378 mole) of 2-methylene glutaronitrile were copolymerized at 70° C. for 4 hrs. to yield 16.4 g. (20.5%) of a brittle glassy solid, inherent viscosity 0.46 (50° C., 0.5 g. per 100 ml. methyl ethyl ketone). Reprecipitation as described in Example VI afforded an analytical sample which contained 11.10% nitrogen, corresponding to a composition of about 41.5 mole percent 2-methylene glutaronitrile and 58.5 mole percent styrene. The mole ratio of the monomers in the feed was 50/50.

EXAMPLE VIII

Essentially as described in Example VI a mixture of 20 g. (0.192 mole) of styrene and 60 g. (0.565 mole) of 2-methylene glutaronitrile were copolymerized at 70° C. for 24 hrs. to yield 5.75% of a solid yellow polymeric product, inherent viscosity 0.28 (50° C., 0.5 g. per 100 ml. methyl ethyl ketone). Reprecipitation as described in Example VI yielded an analytical sample (yellow) which contained 12.59% nitrogen, corresponding to a composition of about 47 mole percent 2-methylene glutaronitrile and 53 mole percent styrene. The mole ratio of the monomers in the feed was 75/25.

From the results of Examples VI–VIII it was found that the reactivity ratios for radical copolymerization of styrene (monomer 1) and 2-methylene glutaronitrile (monomer 2) in emulsion at 70° C. are $r_1=0.35\pm0.08$, and $r_2=0.00\pm0.05$, computed by the method described by F. R. Mayo and F. M. Lewis, J. Am. Chem. Soc., 66, 1594 (1944).

EXAMPLE IX

The emulsion copolymerization of butadiene with 2-methylene glutaronitrile was carried out in capped 10 oz. beverage bottles attached to a rotating wheel in a temperature regulated bath (30° C.). Each bottle was A specimen of the rubbery copolymer of Run 9, found by analysis to contain 26 mole percent 2-methylene glutaronitrile, as well as the standard butadiene-acrylonitrile copolymer of Run 15 (est. about 30% acrylonitrile) were placed in toluene at room temperature. After standing overnight it was observed that the copolymer of Run 9 merely swelled in toluene without dissolving, whereas the standard nitrile rubber copolymer, Run 15, dissolved completely. This evidence indicates a higher aromatic solvent resistance for the elastomeric butadiene-2-methylene glutaronitrile copolymer at nearly the same mole percent level of combined comonomer.

EXAMPLE X

Experiment 9 of Table II was repeated essentially as described in Example IX, except that the copolymerization was carried out in a 1800 ml. stainless steel reaction vessel and the level of tert-dodecyl mercaptain in the General Recipe of Table II was reduced from 0.51 part per 100 parts of total monomers to 0.34 part. In this way there was obtained from a mixture of 346 grams of butadiene-1,3 and 35.2 g. of 2-methylene glutaronitrile after 37 hours of copolymerization in aqueous emulsion at 30° C. a total of 149 parts (39.1% conversion) of an elastomeric copolymer, containing, on analysis, 5.50 5.49% nitrogen, corresponding to an incorporation of 11.9% 2-methylene glutaronitrile on a mole basis.

This elastomeric copolymer was compounded according to the following recipe:

| | Parts by weight |
|---|---|
| Elastomer | 100.0 |
| Zinc oxide | 5.0 |
| Sulfur | 1.5 |
| HAF black | 60.0 |
| Stearic acid | 1.0 |
| Benzothiazyl disulfide | 1.5 |
| Dioctyl adipate | 30.0 |

A sheet of the compounded stock was press cured at 320° F. for 30 minutes and then exhibited the following properties.

Yield:
    Tensile, p.s.i. _____ 1,658
    Modulus, 100% _____ 1,000
    Elong., percent _____ 200
    Shore A Hardness _____ 72

A specimen of the vulcanized elastomer exhibited a 140% volume increase in benzene at room temperature after 8 days.

EXAMPLE XI

Essentially as described in Example IX, a mixture of 19.8 g. (0.367 mole) of butadiene-1,3, 19.4 g. (0.366 mole) of styrene and 19.4 g. (0.183 mole) of 2-methylene glutaronitrile was polymerized in aqueous emulsion at 28° C. for 6.5 hours to yield a total of 33.9 g. (58% conversion) of a hard, tough polymeric product containing 39 mole percent 2-methylene glutaronitrile, 25 mole percent styrene and 36 mole percent butadiene on elemental and infrared analysis.

The terpolymer was compression molded at 150° C. to form a clear, tough, flexible sheet.

EXAMPLE XII

A total 628 parts of a butadiene/2-methylene glutaronitrile latex containing 75.6 parts of a copolymer containing 5.2 mole percent 2-methylene glutaronitrile was placed in a 2-liter, 3-necked glass reaction flask equipped with mechanical stirrer, reflux condenser, thermometer and heating mantle. To the flask was added 350 parts of deoxygenated water. To the contents of the flask was then added 80 g. of styrene and 80 g. of 2-methylene glutaronitrile. The mixture was stirred and heated to 30° C. and 8 ml. of a solution of 5 g. of $K_2S_2O_8$ in 100 ml. aqueous solution, followed by 4 ml. of a solution of 5 g. $NaHSO_3$ in 100 ml. aqueous solution, was added. The resulting mixture was then heated and stirred at 30–35° C. for 43⅔ hrs., whereupon 0.2 g. hydroquinone stopper was added, and after stirring 5 min. the emulsion was strained through cheesecloth to remove insoluble material (22 g.). It was then precipitated by adding to 3-liters of methanol. The precipitated terpolymer product was washed well with water to remove emulsifier and dried in vacuum. Total yield 138.2 g.

The above data show that it is possible to produce terpolymers as well as homopolymers and copolymers from 2-methylene glutaronitrile. The terpolymer may contain about 10 to 80 mole percent 2-methylene glutaronitrile, 15 to 75 mole percent of butadiene, and about 5 to 70 mole percent of styrene. The preferred concentrations will range from about 20 to 65 mole percent of 2-methylene glutaronitrile, about 20 to 60 mole percent of butadiene, and about 15 to 60 mole percent styrene.

While particular embodiments of this invention are illustrated above, it will be understood that the invention is obviously subject to variations and modifications without departing from its broader aspects.

What is claimed is:

1. A process for preparing homopolymers comprising recurring units of the following formula $$-(CH_2-\underset{\underset{\underset{CN}{|}}{\underset{CH_2}{|}}}{\overset{\overset{CN}{|}}{\underset{|}{C}}}-)_n$$

wherein $n$ is an integer of at least 10 which consists essentially of the steps of polymerizing substantially pure 2-methylene glutaronitrile at a temperature below about 0° C. in the presence of an anionic catalyst system selected from the group consisting of sodium cyanide in an organic solvent, sodium in liquid ammonia and organo metallic compounds selected from the group consisting of organo alkali and organo alkaline earth metal compounds, under an inert atmosphere.

2. The process of claim 1 wherein said anionic catalyst system comprises sodium cyanide and N,N-dimethylformamide.

3. The process of claim 1 wherein said anionic catalyst system comprises sodium and liquid ammonia.

4. The process of claim 1 wherein said anionic catalyst system is an alkyl-alkali metal compound.

5. The process of claim 4 wherein said alkyl-alkali metal compound is butyllithium.

6. A process for preparing copolymers which comprises reacting 2-methylene glutaronitrile with a comonomer of the group consisting of acrylonitrile, low molecular weight alkene having from 2 to 18 carbon atoms, vinyl halide, vinyl aromatic hydro-carbon having from 6 to 20 carbon atoms, butadiene, and mixtures thereof, in an aqueous reaction medium under emulsifying conditions at temperatures of about −20° to 80° C., in the presence of minor amounts of a surface-active agent, and a copolymerization initiator.

7. The process of claim 1 wherein said aqueous reaction medium contains a minor amount of a mercaptan modifier.

8. The process of claim 1 wherein said comonomer is acrylonitrile.

9. The process of claim 1 wherein said comonomer is styrene.

10. The process of claim 1 wherein said comonomer is ethylene.

11. The process of claim 1 wherein said comonomer is butadiene.

References Cited

UNITED STATES PATENTS

| 2,609,385 | 9/1952 | Schreyer _____ 260—465.8 |
| 2,636,866 | 4/1953 | Banes et al. _____ 260—23.7 |
| 2,977,337 | 3/1961 | Schuller _____ 260—45.5 |
| 2,791,571 | 5/1957 | Wheelock et al. _____ 260—29.7 |
| 2,841,574 | 7/1958 | Foster. |
| 2,974,119 | 3/1961 | Schuller et al. |
| 3,091,602 | 3/1963 | Himes et al. |

OTHER REFERENCES

Polymerization by Organometallic Compounds by Reich and Schindler (Interscience Publishers) 1966, pp. 59–60.

JOSEPH L. SCHOFER, Primary Examiner.

W. F. HAMROCK, Assistant Examiner.

U.S. Cl. X.R.

260—78.5, 29.7